(12) United States Patent
Tsukada

(10) Patent No.: US 10,834,275 B2
(45) Date of Patent: Nov. 10, 2020

(54) IMAGE FORMING APPARATUS AND METHOD OF CONTROLLING AND ACCESSING PRINT JOB

(71) Applicant: CANON KABUSHIKI KAISHA, Tokyo (JP)

(72) Inventor: Yoshihiro Tsukada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/007,376

(22) Filed: Jun. 13, 2018

(65) Prior Publication Data

US 2018/0376013 A1    Dec. 27, 2018

(30) Foreign Application Priority Data

Jun. 26, 2017    (JP) .................................. 2017-123820

(51) Int. Cl.
| | | |
|---|---|---|
| *G06F 3/12* | (2006.01) | |
| *H04N 1/00* | (2006.01) | |
| *G06F 16/16* | (2019.01) | |
| *G06F 16/185* | (2019.01) | |
| G06F 3/0482 | (2013.01) | |
| G06F 3/0481 | (2013.01) | |

(52) U.S. Cl.
CPC ....... *H04N 1/00427* (2013.01); *G06F 16/168* (2019.01); *G06F 16/185* (2019.01); *H04N 1/00424* (2013.01); *H04N 1/00429* (2013.01); *G06F 3/0482* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 7,774,853 | B2* | 8/2010 | Yoshida | G06F 21/6209 |
| | | | | 726/27 |
| 8,134,721 | B2* | 3/2012 | Mizutani | B41J 2/17546 |
| | | | | 358/1.13 |
| 8,223,366 | B2* | 7/2012 | Okajima | G06F 3/1213 |
| | | | | 358/1.1 |
| 8,319,980 | B2* | 11/2012 | Hatakeyama | G06F 3/1204 |
| | | | | 358/1.1 |

(Continued)

FOREIGN PATENT DOCUMENTS

JP    2005-50224 A    2/2005

*Primary Examiner* — Dung D Tran
(74) *Attorney, Agent, or Firm* — Canon U.S.A., Inc., IP Division

(57) ABSTRACT

An image forming apparatus includes a display device that displays information and an image forming device that forms an image on a sheet. The image forming apparatus can cause the image forming device to form an image on the basis of a file acquired from an external system that manages files in a directory having a hierarchical structure. The image forming apparatus includes at least one controller that functions as a unit that acquires information which is information of a printable file of files managed by the external system and which includes at least storage directory information of the printable file, a unit that causes the display device to display a folder tree screen based on the storage directory information, and a unit that causes the image forming device to perform image formation based on a file selected on the folder tree screen.

14 Claims, 7 Drawing Sheets

(56) References Cited

U.S. PATENT DOCUMENTS

| | | | | |
|---|---|---|---|---|
| 8,368,939 B2* | 2/2013 | Hanamoto | | G06K 15/00 |
| | | | | 358/1.16 |
| 8,422,045 B2* | 4/2013 | Yamada | | H04N 1/00347 |
| | | | | 358/1.14 |
| 8,582,170 B2* | 11/2013 | Isshiki | | G06F 3/1205 |
| | | | | 358/1.15 |
| 8,913,279 B2* | 12/2014 | Kise | | G06F 3/1296 |
| | | | | 358/1.15 |
| 2006/0103873 A1* | 5/2006 | Reddy | | H04N 1/00204 |
| | | | | 358/1.15 |
| 2007/0171436 A1* | 7/2007 | Manchester | | G06K 15/005 |
| | | | | 358/1.1 |
| 2007/0206225 A1* | 9/2007 | Shinohara | | H04N 1/00127 |
| | | | | 358/1.16 |
| 2008/0074508 A1* | 3/2008 | Shiohara | | H04N 1/00427 |
| | | | | 348/222.1 |
| 2008/0239375 A1* | 10/2008 | Okajima | | G06F 3/1213 |
| | | | | 358/1.15 |
| 2011/0058222 A1* | 3/2011 | Nomoto | | G06F 17/30126 |
| | | | | 358/1.16 |
| 2012/0050797 A1* | 3/2012 | Tamura | | H04N 1/00503 |
| | | | | 358/1.15 |
| 2012/0162705 A1* | 6/2012 | Kodama | | G06F 3/1285 |
| | | | | 358/1.15 |
| 2013/0162663 A1* | 6/2013 | Mano | | G06T 1/60 |
| | | | | 345/530 |
| 2017/0054861 A1* | 2/2017 | Dejoras | | H04N 1/00429 |
| 2017/0315760 A1* | 11/2017 | Kesavan | | G06F 3/125 |
| 2018/0239566 A1* | 8/2018 | Kanamoto | | G06F 3/1206 |

\* cited by examiner

IMAGE FORMING APPARATUS AND METHOD OF CONTROLLING AND ACCESSING PRINT JOB

BACKGROUND OF THE INVENTION

Field of the Invention

The present invention relates to an image forming apparatus that can acquire a file from an external system and perform printing, a control method of an image forming apparatus, and a program.

Description of the Related Art

There is an image forming apparatus installed with a function to receive and print image data and document data stored in an external system such as a cloud and a server connected to a network. A file and a folder on the cloud and the server may be used by a plurality of users, so that the file and the folder are generally managed by account and an access authority is set for each user type.

In recent years, a cloud is often used and there is a request for printing a document of the cloud without using an information equipment terminal held by an individual. In this case, a function is required that searches for and displays image data and document data on an external storage apparatus in a hierarchical structure in order for a user to specify data to be printed.

For example, when a user browses photographic data from data stored in a storage on a cloud, if an icon of a folder is an icon that means that an image is included in the folder, steps for the user to search for the folder are reduced, so that convenience is improved.

Japanese Patent Laid-Open No. 2005-50224 proposes a technique that improves user operability when displaying data in a hierarchical structure.

In the related art, it is possible to easily know a storage folder of image data. However, when the user browses a hierarchical structure in order to perform printing, the user cannot easily know a folder where a printable file is stored.

SUMMARY OF THE INVENTION

An aspect is to provide a mechanism that can cause a user to easily recognize a folder where a printable file is stored and select a file to be printed with fewer procedures when the user browses folders in an external system from an image forming apparatus in order to perform printing.

An aspect is to provide an image forming apparatus which includes a display device that displays information and an image forming device that forms an image on a sheet on the basis of a file acquired from an external system that manages files in a directory having a hierarchical structure. The image forming apparatus includes at least one controller that functions as a unit that acquires information which is information of a printable file of files managed by the external system and which includes at least storage directory information of the printable file, a unit that causes the display device to display a folder tree screen based on the storage directory information, and a unit that causes the image forming device to perform image formation based on a file selected on the folder tree screen. In the folder tree screen, a folder where a printable file is stored in a lower layer and a folder where no printable file is stored in a lower layer are depicted differently in the display.

Further features will become apparent from the following description of exemplary embodiments (with reference to the attached drawings).

DESCRIPTION OF THE EMBODIMENTS

Hereinafter, an embodiment will be described with reference to the drawings. The embodiment described below is not limited according to claims, and not all combinations of features described in the embodiment are necessarily essential.

Figure 1:
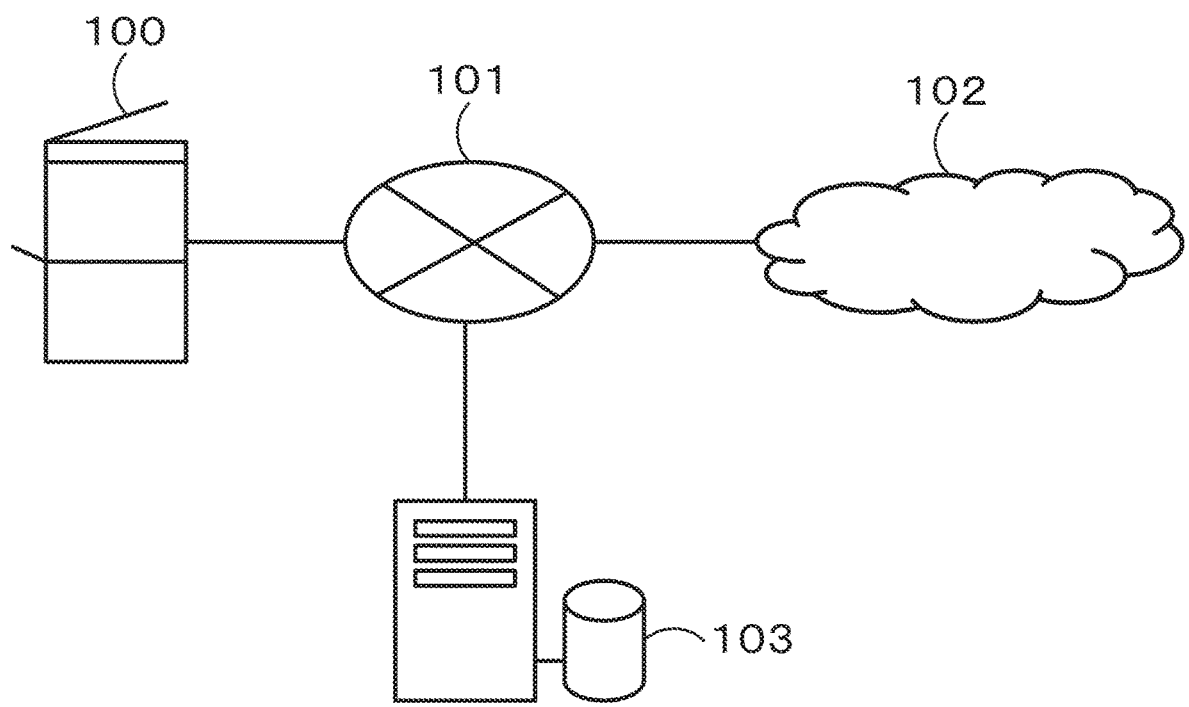
FIG. 1 is a diagram for explaining an embodiment of a system configuration including an image forming apparatus.

FIG. 1 is a diagram for explaining an embodiment of a system configuration including an image forming apparatus 100.

A cloud 102 and a server 103 are external systems that store and manage files in a folder having a hierarchical structure.

The image forming apparatus 100 performs acquisition of folder configuration information, a transmission of data obtained by scanning, a change request of access authority, and the like on the cloud 102 and the server 103 through a network 101. The cloud 102 and the server 103 receive communication from the image forming apparatus 100 and transmit a response for storage and request of file. Although details will be described later, the image forming apparatus 100 has a print function to be able to receive a file from the cloud 102 and/or the server 103 and print the file.

Figure 2:
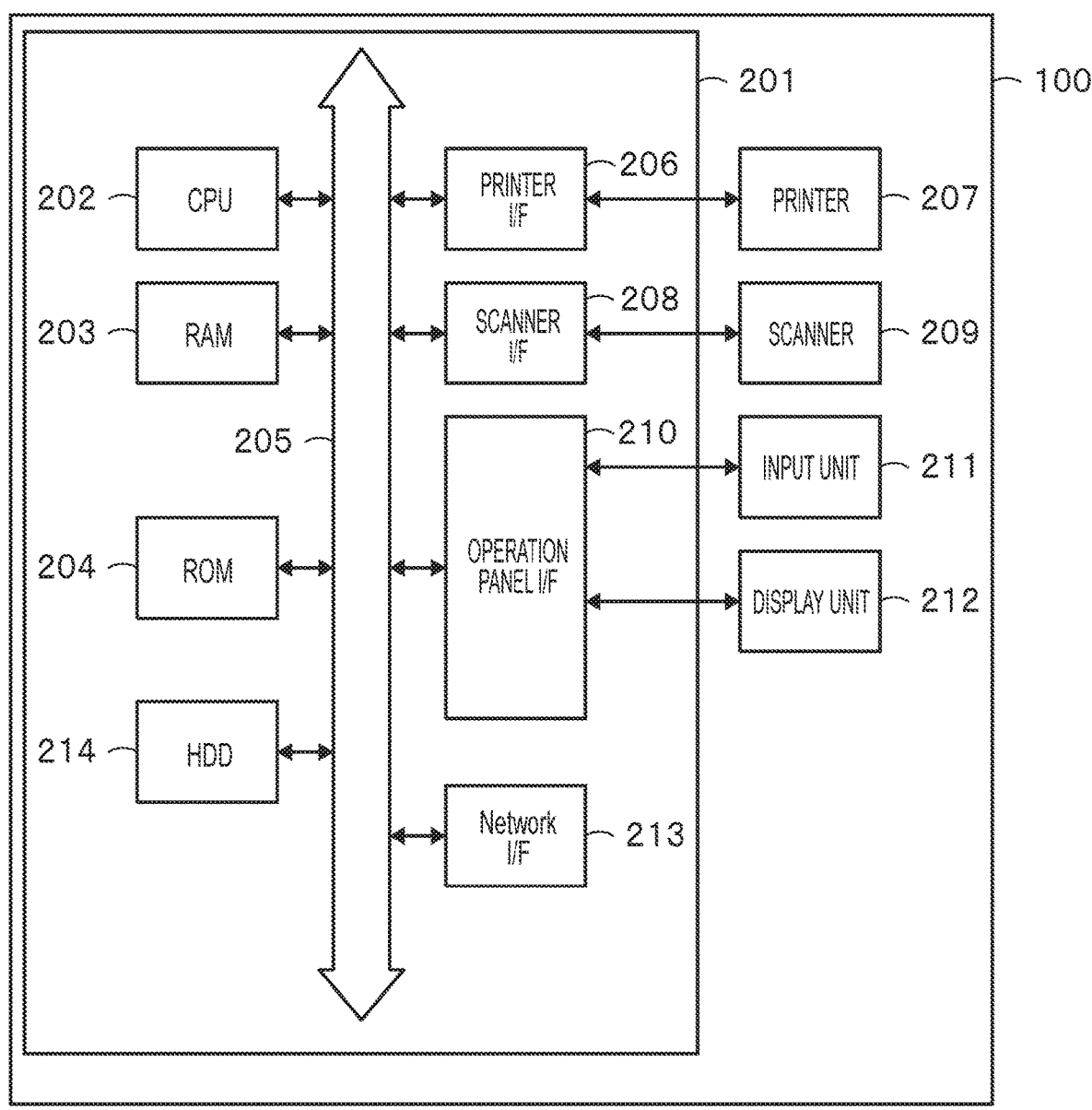
FIG. 2 is a diagram for explaining a hardware configuration of the image forming apparatus of the embodiment.

FIG. 2 is a block diagram for explaining a hardware configuration of the image forming apparatus 100 of the present embodiment.

A control unit 201 controls an operation of the entire image forming apparatus 100.

In the control unit 201, a CPU 202 reads a control program stored in a ROM 204 and performs various controls such as communication control. The ROM 204 stores the control program and various data. The ROM 204 is, for example, a flash memory. A RAM 203 is used as a main memory and a temporary storage area such as a work area of the CPU 202. An HDD 214 is a hard disk that stores data, various programs, and various information tables. The image forming apparatus 100 may be provided with another storage apparatus such as an SSD (solid state drive) instead of or along with the HDD.

A printer I/F 206 functions as an interface that outputs an image signal to a printer 207 (printer engine). A scanner I/F 208 functions as an interface that inputs an image signal read from a scanner 209 (scanner engine). The CPU 202 can process the image signal inputted from the scanner I/F 208 and output the processed image signal to the printer I/F 206 as a recording image signal.

An operation panel I/F 210 connects a display unit 212 with the control unit 201 and connects an input unit 211 with the control unit 201. For example, the display unit 212 and the input unit 211 constitute an operation panel, and a touch panel type display and hard keys provided on the operation panel correspond to the display unit 212 and the input unit 211.

A network I/F 213 is for transmitting information to external apparatuses such as the cloud 102 and the server 103 or receiving various information from these external devices. Blocks in the control unit 201 are connected by a system bus 205.

Figure 3:
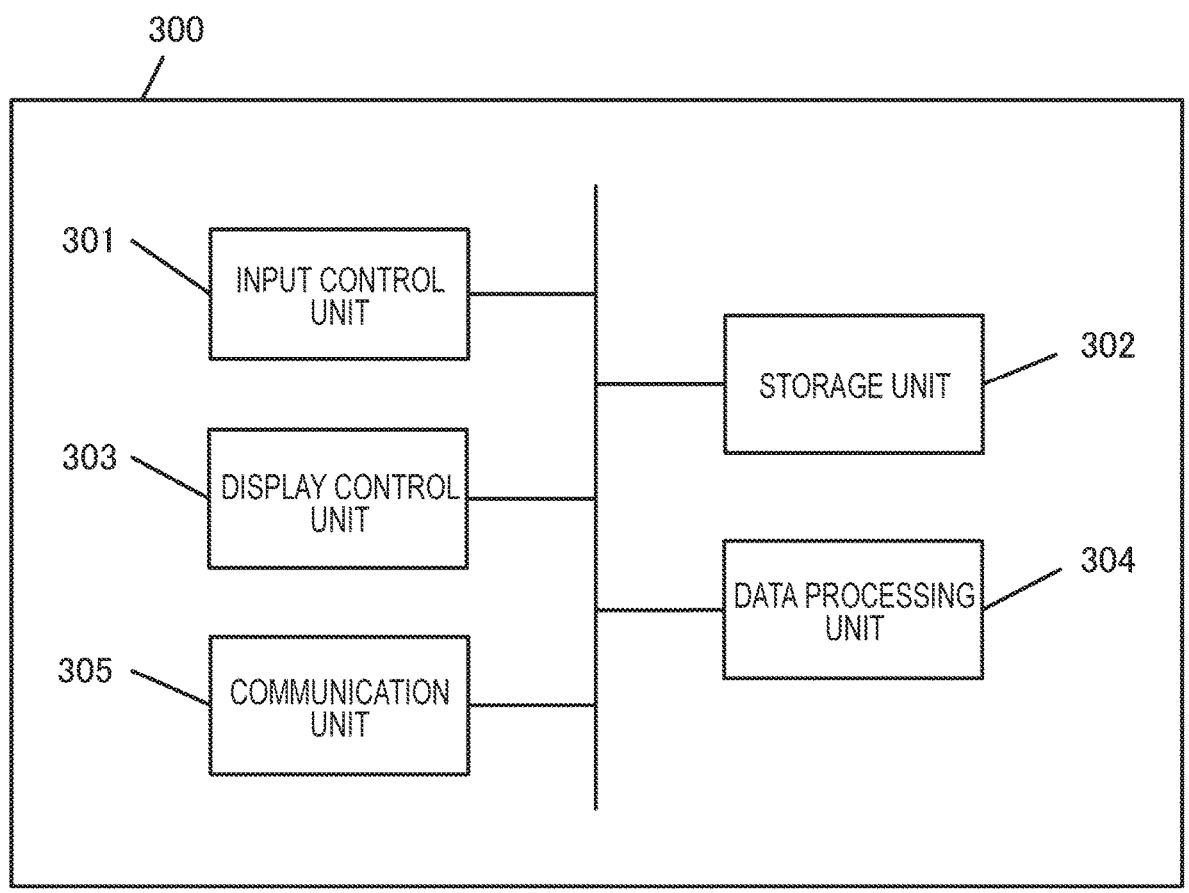
FIG. 3 is a diagram for explaining a software configuration of the image forming apparatus of the embodiment.

FIG. 3 is a diagram for explaining a software configuration 300 of the image forming apparatus 100 of the present embodiment. Each functional unit shown in FIG. 3 is realized when the CPU 202 included in the image forming apparatus 100 executes a control program stored in the ROM 204 or the HDD 214.

An input control unit 301 controls the input unit 211, waits for instruction input from a user, and notifies another functional unit of received instruction content.

A storage unit 302 stores specified data into the ROM 204, the HDD 214, or the like, or reads data stored in the ROM 204, the HDD 214, or the like, by an instruction from another functional unit. In the present embodiment, the storage unit 302 records authentication information for users to log in to the image forming apparatus 100, authentication information to the cloud 102 and the server 103, and the like.

A display control unit 303 controls display of an operation menu and an instruction result on the display unit 212.

A data processing unit 304 performs processing to convert data obtained by scanning performed by the scanner 209 into an appropriate file format. Further, the data processing unit 304 integrally controls the software configuration 300.

A communication unit 305 controls communication with an external storage apparatus through the network I/F 213.

Figure 4:
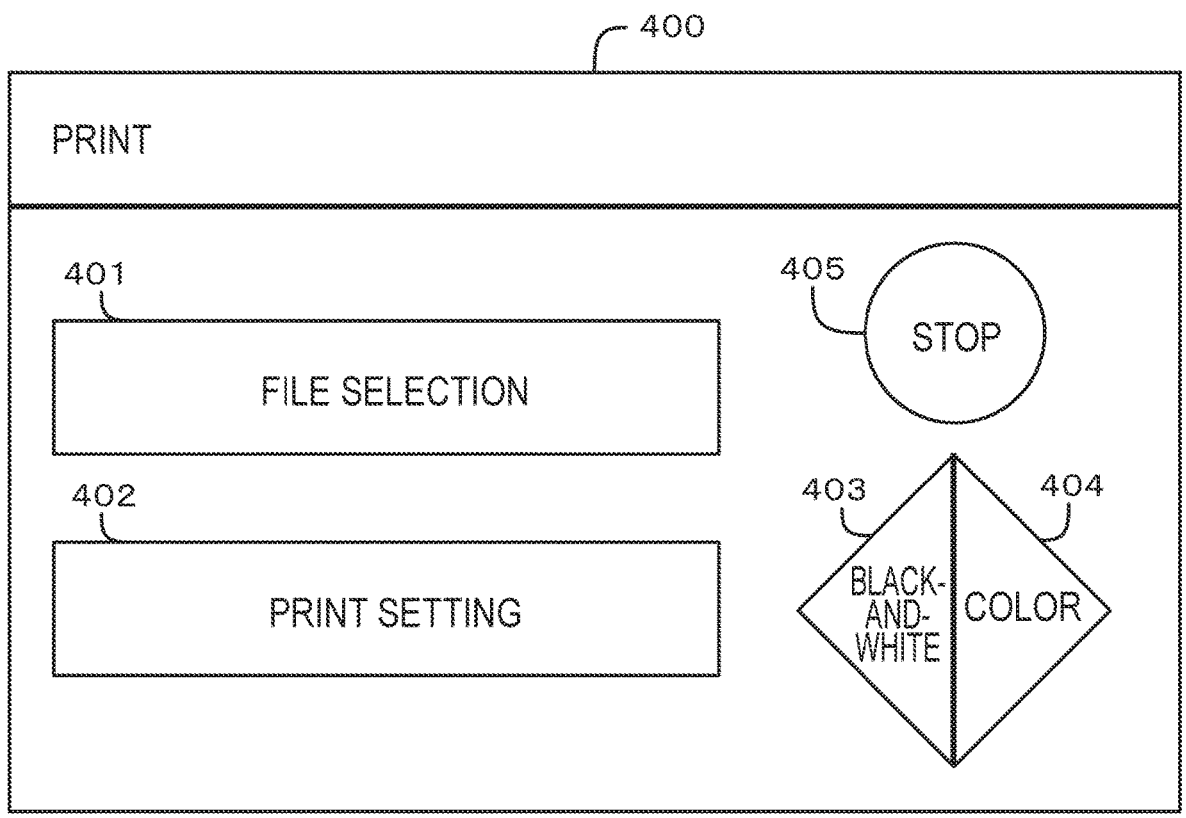
FIG. 4 is a diagram showing an example of a print function screen displayed on the image forming apparatus of the embodiment.

FIG. 4 is a diagram showing an example of a print function screen 400 displayed on the display unit 212 in the image forming apparatus 100 of the present embodiment.

When the input control unit 301 receives a predetermined user operation on the input unit 211, the display control unit 303 displays the print function screen 400 on the display unit 212. The user can acquire data from the external cloud 102 and/or server 103 connected to the network 101 by an operation on the print function screen 400 and print out the data by the printer 207.

Figure 5:
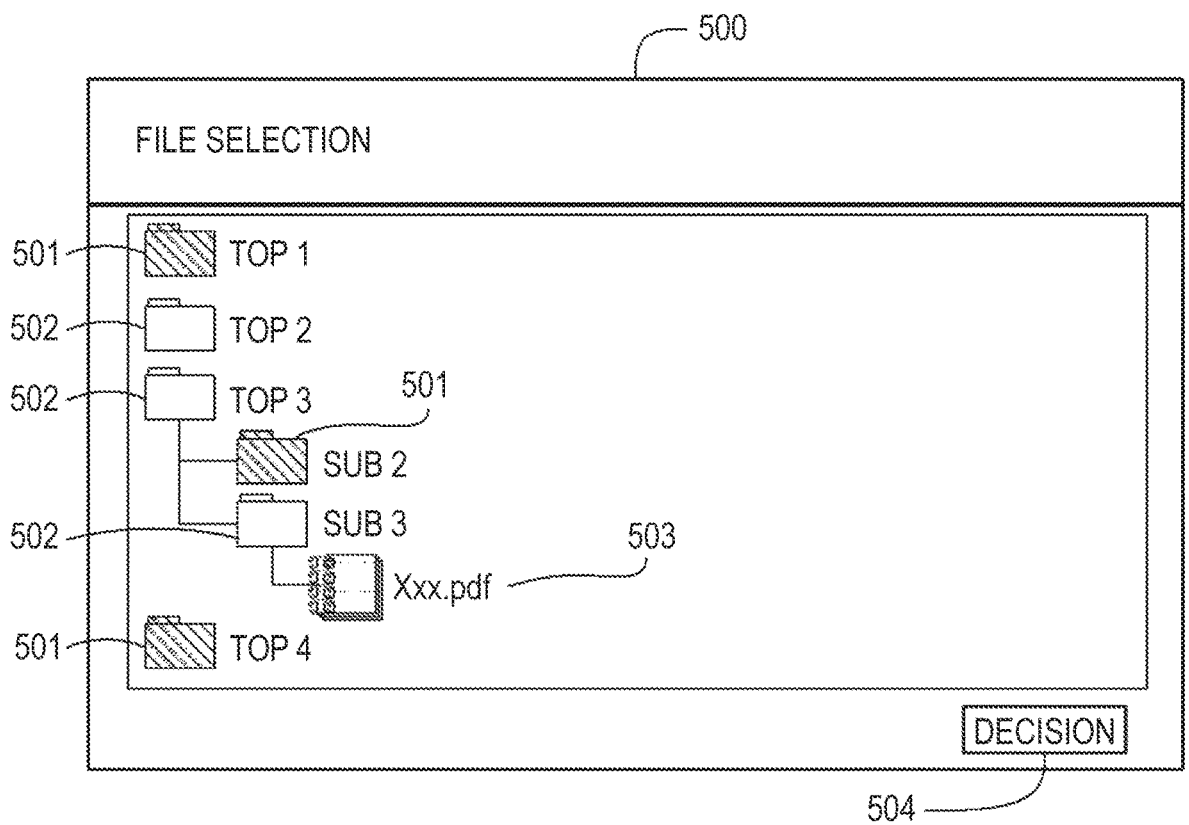
FIG. 5 is a diagram showing an example of a file selection screen displayed on the image forming apparatus of the embodiment.

On the print function screen 400, a file selection button 401 is a button to cause a transition to a file selection screen 500 shown in FIG. 5 described later. Specifically, when the input control unit 301 receives a pressing down operation of the file selection button 401, the display control unit 303 displays the file selection screen 500 (FIG. 5). The file selection screen 500 (FIG. 5) is a screen for displaying directories and files in the cloud 102 and the server 103 on the image forming apparatus 100 and selecting a directory and a file.

A print setting button 402 is a button for causing a transition to a print setting screen not shown in the drawings. Specifically, when the input control unit 301 receives a pressing down operation of the print setting button 402, the display control unit 303 displays a print setting screen (not shown in the drawings). The print setting screen (not shown in the drawings) is a screen for performing setting of resolution, output paper, and the like, and performing printing of a file selected and fixed on the file selection screen 500 (FIG. 5) described later.

A black-and-white button 403 is a button for storing scanned data in a transmission destination as monochrome data. A color button 404 is a button for storing scanned data in a transmission destination as color data. A STOP key 405 is a button for interrupting processing.

FIG. 5 is a diagram showing an example of the file selection screen 500 displayed on the display unit 212 when the file selection button 401 in FIG. 4 is pressed.

A grayed-out folder 501 shown with oblique lines on the file selection screen 500 is a folder that includes no printable file in the folder and folders under the folder. The grayed-out folder 501 is a folder displayed in a form, where the inside of the folder cannot be browsed (a folder displayed in a grayed-out form).

A folder 502 is a folder that includes a printable file 503 in the folder 502 or a folder under the folder 502. The folder 502 is a folder displayed in a form, where the inside of the folder can be browsed (a normally displayed folder).

When a user selects an arbitrary folder displayed on the file selection screen 500, folders and files under the folder are displayed. Specifically, when the input control unit 301 receives an operation to select a folder (unfolding operation), the display control unit 303 displays folders and files in the selected folder on the file selection screen 500. Further, when the input control unit 301 receives an operation to select a file, the display control unit 303 displays the selected file in a display form corresponding to a selected state (for example, a file name is reversely displayed, or a display color is changed). It is possible to select a plurality of files. On the file selection screen 500, it is possible to follow a hierarchical structure and select a file to be printed in this way.

Further, when a user presses a decision button 504 while selecting an arbitrary file, the user can decide a file to be received from the cloud 102 or the server 103. Specifically, when the input control unit 301 receives a pressing operation of the decision button 504 while a file is being selected, the input control unit 301 determines that the file is a file to be acquired from the cloud 102 or the server 103. Further, the display control unit 303 closes the file selection screen 500 and returns the screen to the print function screen 400. The file selected and fixed on the file selection screen 500 is printed by an operation from the print setting button 402 described above.

In the present embodiment, a folder that includes no printable file is shown with oblique lines. However, the folder may be shown in another form if the folder is shown in a form that can be distinguished from a folder that includes a printable file, such as a form where a font type or a font color of a folder name is changed.

Figure 6:
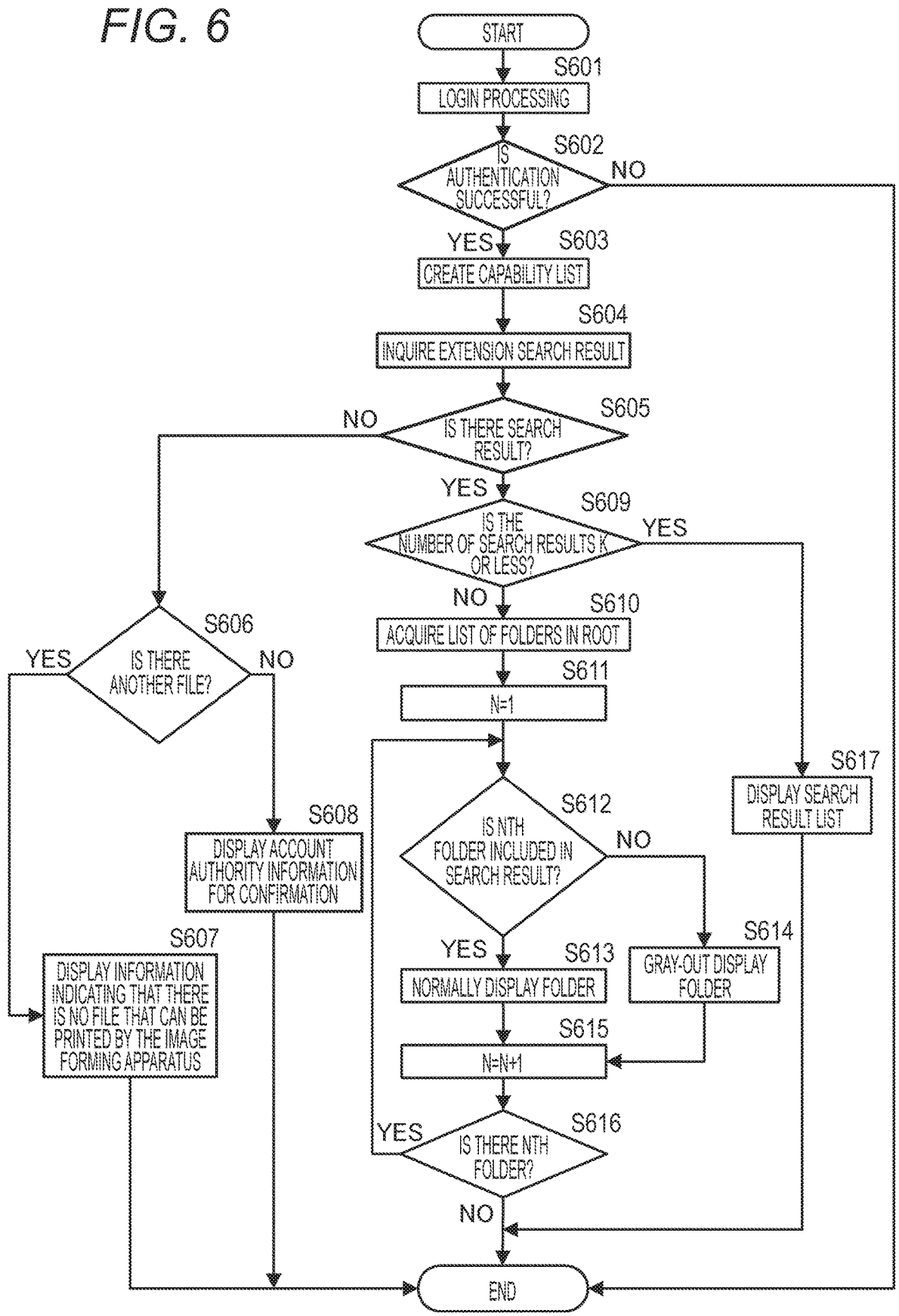
FIG. 6 is a flowchart for explaining an operation of the image forming apparatus of the embodiment.

FIG. 6 is a flowchart for explaining an operation of the CPU 202 when displaying the file selection screen 500. The processing of the flowchart is started when detecting that the file selection button 401 is pressed on the print function screen 400. However, steps S601 to S604 can be performed when the power of the image forming apparatus 100 is turned on, or when a user logs in to the image forming apparatus 100, or when the print function screen 400 is displayed. In the present embodiment, an access destination of the image forming apparatus 100 is the cloud 102. However, the access destination can be the server 103. The processing of the flowchart in FIG. 6 is realized when the CPU executes a control program stored in the ROM 204 or the HDD 214.

In the description below, the access destination of the image forming apparatus 100 is assumed to be the cloud 102. However, the same goes when the access destination of the image forming apparatus 100 is the server 103.

First, in S601, the data processing unit 304 sends a login request to the cloud 102 by using the communication unit 305 on the basis of a user ID and a user password which are authentication information acquired from the storage unit 302. In the present example, a session with the cloud 102 is established by the user ID and the user password. However, a login format is not limited to this.

Next, in S602, the data processing unit 304 receives a response from the cloud 102 through the communication unit 305 and determines whether or not the authentication is successfully performed. When the authentication is successfully performed, the data processing unit 304 can acquire a session ID with a time limit from the cloud 102, and thereafter the data processing unit 304 can communicate with the cloud 102 by using the session ID. In other words, when the data processing unit 304 can receive the session ID, the data processing unit 304 determines that the authentication is successfully performed, and when the data processing unit 304 cannot receive the session ID, the data processing unit 304 determines that the authentication is failed.

When the data processing unit 304 determines that the authentication is failed in S602 (No in S602), the data processing unit 304 causes the display control unit 303 to display a notification indicating that the login is failed on the display unit 212 and ends the processing of the flowchart.

On the other hand, the when data processing unit 304 determines that the login is successfully performed because of successful authentication (Yes in S602), the data processing unit 304 advances the processing to S603.

In S603, the data processing unit 304 creates a capability list of image formats where the image forming apparatus 100 can print. Here, the capability list of image formats is a character string list of file extensions. For example, when PDF (Portable Document Format) is defined as a printable file format, the data processing unit 304 lists character strings of extensions ".pdf" and ".PDF" that indicate a PDF file in the capability list. It is assumed that the image formats where the image forming apparatus 100 can print are determined from, for example, a firmware version of the image forming apparatus 100, an application installed in the image forming apparatus 100, and the like. Here, a case is described where character strings of extensions of file formats where the image forming apparatus 100 can print are listed in the capability list. However, it is possible to list other information if it is information that can specify a file which the image forming apparatus 100 can print, such as information that indicates a type of a file which the image forming apparatus 100 can print.

Next, in S604, the data processing unit 304 transmits the capability list to the cloud 102 through the communication unit 305 and requests the cloud 102 to transmit a result of extension search. The cloud 102 searches for file names corresponding to a character string list, for which the search request is issued, from among files that can be accessed by the user ID used for the authentication in accordance with a character string list (capability list) of extensions for which the search request is issued. Further, the cloud 102 creates a character string list of absolute paths including file names as a search result and transfers the character string list to the image forming apparatus 100 as a response. The data processing unit 304 acquires the response from the cloud 102 through the communication unit 305 and advances the processing to S605.

In 605, the data processing unit 304 determines whether or not the response acquired in S604 includes a search result (that is, a character string list of absolute paths including file names).

When the data processing unit 304 determines in S605 that the response acquired in S604 includes no search result (that is, the response includes no character string list of absolute paths including file names) (No in S605), the data processing unit 304 advances the processing to S606.

In S606, the data processing unit 304 makes an inquiry to the cloud 102 whether or not there is a file other than the files, for which the search request is issued, through the communication unit 305. In response to the inquiry, the cloud 102 searches for a file that can be accessed by the user ID used for the authentication, and transfers information that can specify whether or not there is an accessible file to the image forming apparatus 100 as a response. The data processing unit 304 acquires the response from the cloud 102 through the communication unit 305 and determines whether or not there is another file on the basis of the response.

When the data processing unit 304 determines in S606 that there is the other file (Yes in S606), the data processing unit 304 advances the processing to S607.

In S607, the data processing unit 304 causes the display control unit 303 to display a notification indicating that there is no file that can be printed by the image forming apparatus 100 on the display unit 212 and ends the processing of the flowchart.

On the other hand, when the data processing unit 304 determines in S606 that there is not the other file (No in S606), the data processing unit 304 advances the processing to S608.

In S608, there is a probability that there is a file in a location that cannot be accessed with the user ID used for the authentication, so that the data processing unit 304 causes the display control unit 303 to display a notification urging confirmation of the authentication information (confirmation of access authority) on the display unit 212. Thereafter, the data processing unit 304 ends the processing of the flowchart.

When the data processing unit 304 determines in S605 that the response acquired in S604 includes a search result (that is, the response includes a character string list of absolute paths including file names) (Yes in S605), the data processing unit 304 advances the processing to S609.

In S609, the data processing unit 304 determines whether or not the number of absolute path character string lists included in the search result acquired in S604 is K or less. Here, K is the number of lines that can be displayed on one screen. For example, in the case of the file selection screen 500, K=6.

When the data processing unit 304 determines in S609 that the number of absolute path character string lists included in the search result is not K or less (No in S609), the data processing unit 304 advances the processing to S610.

In S610, the data processing unit 304 sends an acquisition request of a list of folders in the root to the cloud 102 through the communication unit 305. The cloud 102 responds to the request, acquires a list of folders and files (folder list) in the uppermost folder (root folder) of the folders that can be accessed by the user ID used for the authentication, and transfers the list to the image forming apparatus 100 as a response. The data processing unit 304 acquires the response from the cloud 102 through the communication unit 305 and advances the processing to S611.

In S611, the data processing unit 304 defines a number N that indicates a current object folder as 1 and advances the processing to S612.

In S612, the data processing unit 304 determines whether or not a folder name of the Nth folder in the folder list acquired in S610 is included in the absolute path character string lists acquired in S604 as the search result. Thereby, it is possible to determine whether or not there is a printable file in the Nth or lower folder.

When the data processing unit 304 determines in S612 that the folder name of the Nth folder is included in the absolute path character string lists acquired in S604 as the search result (Yes in S612), the data processing unit 304 advances the processing to S613.

In this case, the data processing unit 304 determines in S613 that there is a printable file in the Nth or lower folder, causes the display control unit 303 to normally display the Nth folder on the display unit 212 (for example, 502 in FIG. 5), and advances the processing to S615.

On the other hand, in S612, when the data processing unit 304 determines that the folder name of the Nth folder is not included in the absolute path character string lists acquired in S604 as the search result (No in S612), the data processing unit 304 advances the processing to S614.

In this case, the data processing unit 304 determines in S614 that there is no printable file in the Nth and lower folders, causes the display control unit 303 to gray-out display the Nth folder on the display unit 212 (for example, 501 in FIG. 5), and advances the processing to S615.

In S615, the data processing unit 304 increments N by 1 and advances the processing to S616.

In S616, the data processing unit 304 determines whether or not there is the Nth folder in the folder list acquired in S610.

When the data processing unit 304 determines in S616 that there is the Nth folder in the folder list acquired in S610 (Yes in S616), the data processing unit 304 advances the processing to S612.

On the other hand, when the data processing unit 304 determines in S616 that there is not the Nth folder in the folder list acquired in S610 (No in S616), the data processing unit 304 ends the processing of the flowchart.

Further, when the data processing unit 304 determines in S609 that the number of absolute path character string lists included in the search result is K or less (Yes in S609), the data processing unit 304 advances the processing to S617.

In S617, the data processing unit 304 causes the display control unit 303 to display an absolute path character string list (search result list) 701 included in the search result acquired in S604 on the display unit 212 as shown in a file selection screen 700 and ends the processing of the flowchart.

Figure 7:
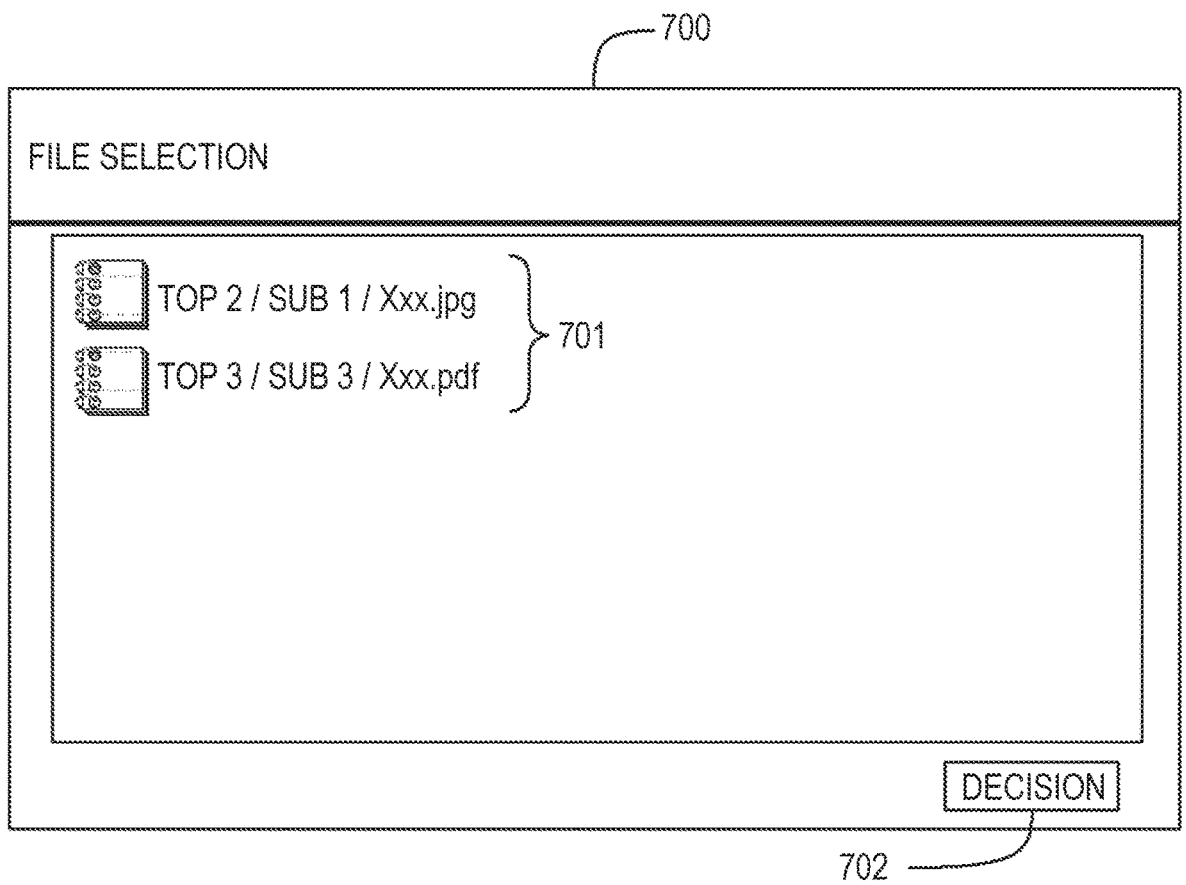
FIG. 7 is a diagram showing an example of a file selection screen displayed on the image forming apparatus of the embodiment.

FIG. 7 is a diagram showing an example of the file selection screen 700 that is displayed on the display unit 212 when the file selection button 401 in FIG. 4 is pressed.

When the input control unit 301 receives an operation to select a file on the file selection screen 700, the display control unit 303 displays the selected file in a display form corresponding to a selected state (for example, a file name is reversely displayed, or a display color is changed). It is possible to select a plurality of files.

Further, when a user presses a decision button 702 while selecting an arbitrary file, the user can decide a file to be received from the cloud 102 or the server 103. Specifically, when the input control unit 301 receives a pressing operation of the decision button 702 while a file is being selected, the input control unit 301 determines that the file is a file to be acquired from the cloud 102 or the server 103. Further, the display control unit 303 closes the file selection screen 700 and returns the screen to the print function screen 400. The file selected and fixed on the file selection screen 700 is printed by an operation from the print setting button 402 described above.

The flowchart in FIG. 6 is to explain processing for reducing procedures by which a user displays a printable file, so that file selection processing and print processing are omitted in FIG. 6. The user can fix a file to be printed by performing operation processing on the file selection screen as shown in FIG. 5 or 7, which is displayed by the processing of FIG. 6, and perform printing by a print operation after moving to a print setting screen (not shown in the drawings) from the print setting button 402 in FIG. 4.

When the user selects an arbitrary folder displayed on the file selection screen 500, folders and files under the folder are displayed. At this time, the data processing unit 304 specifies the selected folder and sends an acquisition request of a list of folders under the folder to the cloud 102 through the communication unit 305. The cloud 102 responds to the request, acquires a list of folders and files (folder list) in the specified folder, and transfers the folder list to the image forming apparatus 100 as a response. The data processing unit 304 acquires the response from the cloud 102 through the communication unit 305. Then the data processing unit 304 performs the same processing as that of S611 to S616 in FIG. 6 on the folder list acquired as the response, and normally displays or gray-out displays folders immediately under the selected folder. Specifically, for each folder under the selected folder, when there is a printable file in the folder or under the folder, the folder is normally displayed, and when there is no printable file in the folder or under the folder, the folder is gray-out displayed.

In the above description of the flowchart, first, information of subfolders and files included in a root folder corresponding to an authenticated, user ID is acquired. Thereafter, each time an instruction for browsing inside of a folder is issued, information of folders and files included in the folder where the browsing instruction is issued is acquired, and hierarchical information of the folder is updated. However, the data processing unit 304 may acquire the entire hierarchical structure in the root folder or under the root folder corresponding to the authenticated user ID at a timing of S610.

In the present embodiment, a configuration is described in which a folder where there is no printable file in the folder and in folders under the folder is gray-out displayed. However, it may be configured so that a folder where there is no printable file in the folder and in folders under the folder is not displayed.

In the present embodiment, whether or not there is printable data is searched for in advance, folders including at least one printable document in the folders or in folders under the folders are normally displayed, and the other folders are gray-out displayed, so that usability can be improved. By such a constitution, it is possible to reduce user operations and improve convenience when the image forming apparatus acquires data from an external system such as a cloud and performs printing. In other words, it is possible to display a screen where a user can select a file, which the user wants to print, with fewer procedures. As a result, as described above, in the case of a configuration where each time a folder is selected, folders and files in the selected folder are acquired from an external system, it is possible to reduce the number of access times until a file to be printed is selected. Thereby, it is possible to reduce traffic between the external system and the image forming apparatus. Further, in the case of an external system where access times are limited, it is possible to reduce the number of access times to the external system, so that it is possible to reduce a risk that a limitation of the number of access times is reached. According to the present embodiment, when browsing folders in an external system from the image forming apparatus in order to perform printing, it is possible to easily recognize a folder where a printable file is stored and select a file to be printed with fewer procedures. As a result, it is possible to improve usability.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-123820, filed Jun. 26, 2017, which is hereby incorporated by reference herein in its entirety.

What is claimed is:

1. An image forming apparatus which includes a display device that displays information and an image forming device that forms an image on a sheet on the basis of a file acquired from an external system that manages files in a directory having a hierarchical structure, the image forming apparatus comprising,
at least one controller configured to:
acquire, from the files managed by the external system, storage directory information representing the heirarchical structure of the managed files, the storage directory information including one or more subfolder in which the managed files are stored;
determine, from the acquired storage directory information, which of the managed files are files having an extension printable by the image forming apparatus;
cause the display device to display a folder tree screen including a folder tree and the one or more subfolders based on the storage directory information and the files determined to have an extension that is printable by the image forming apparatus,
wherein subfolders in the folder tree determined to include at least one file with an extension that is printable by the image forming apparatus is displayed to be visibly distinguishable from subfolders in the folder tree determined not include any files having extensions that are printable by the image forming apparatus; and
cause the image forming device to perform image formation based on a file selected on the folder tree screen.

2. The image forming apparatus according to claim 1, wherein the at least one controller further configured to:
acquire information of an accessible directory of directories of the external system,
wherein the folder tree screen is a screen based on the information of an accessible directory in addition to the storage directory information.

3. The image forming apparatus according to claim 1, wherein the at least one controller is configured to
display, in the folder tree screen, subfolders determined to include one or more files with the file extension printable by the image forming apparatus in a manner indicating that an unfolding operation can be performed based on selection thereof, and
display, in the folder tree screen, subfolders determined not to include files with file extensions that are printable by the image forming apparatus in a manner indicating that an unfolding operation cannot be performed.

4. The image forming apparatus according to claim 1, wherein the at least one controller further configured to:
acquire file information in a folder from the external system when the first folder or the second folder is selected in the folder tree screen.

5. The image forming apparatus according to claim 4, wherein the folder tree screen is updated on the basis of file information acquired by folder selection.

6. A control method for an apparatus which includes a display device that displays information and an image forming device that forms an image on a sheet on the basis of a file acquired from an external system that manages files in a directory having a hierarchical structure, the control method comprising:
acquiring, from the files managed by the external system, storage directory information representing the heirarchical structure of the managed filed, the storage directory information including one or more subfolder in which the managed files are stored;
determined, from the acquired storage directory information, which of the managed files are files having an extension printable by the image forming apparatus;
causing the display device to display a folder tree screen including a folder tree and the one or more subfolders based on the storage directory information, wherein subfolders in the folder tree determined to include at least one file with an extension that is printable by the image forming apparatus is displayed to be visibly distinguishable from subfolders in the folder tree determined not to include any files having extensions that are printable by the image forming apparatus; and
causing the image forming device to perform image formation based on a file selected on the folder tree screen.

7. An image forming apparatus, the image forming apparatus comprising:

a display; and one or more controllers configured to:

obtains information identifying a folder tree including one or more subfolders having files stored therein;

determine, for display on the display, an icon associated with a respective subfolder among at least the one or more subfolders based on an identifier of at least one file stored in the at least the one or more subfolders;

cause the display to display the folder tree where the at least the one or more subfolders is represented by the determined icon and the determined icon is based on the identifier of the file indicating that the file is printable by the image forming apparatus.

8. The image forming apparatus, according to claim 7, the at least one controller is further configured to display different icons for subfolders where the identifier of the file indicates a printable file is stored in the subfolder of the image forming apparatus and for subfolders where the identifier of the file indicates that file unable to be printed by the image forming apparatus is stored in the subfolder of the image forming apparatus.

9. The image forming apparatus, according to claim 8, wherein an extension of the printable file of the image forming apparatus is pdf.

10. The image forming apparatus, according to claim 7, wherein the icon displayed for the subfolder where the identifier of the file indicates that file unable to be printed by the image forming apparatus and for subfolders where the identifier indicates no printable file is stored in the subfolder, is displayed in a gray-out form.

11. The image forming apparatus, according to Claim 7, wherein the identifier of the file is an extension of the file.

12. The image forming apparatus, according to claim 7, wherein the folder has a hierarchical structure.

13. The image forming apparatus, according to claim 12, wherein the at least one controller is further configured to determine the icon of the folder based on the identifier of the file stored in the subfolder and the identifier of the file stored in a lower layer folder of the subfolder.

14. A control method for an apparatus, the control method comprising:

obtains information identifying a folder tree including one or more subfolders having files stored therein;

determine, for display on the display, an icon associated with a respective subfolder among at least the one or more subfolders based on an identifier of at least one file stored in the at least the one or more subfolders;

cause a display to display the folder tree where the at least the one or more subfolders is represented by the determined icon and the determined icon is based on the identifier of the file indicating that the file is printable by the apparatus.

* * * * *